(12) United States Patent
Floor et al.

(10) Patent No.: US 6,345,949 B1
(45) Date of Patent: Feb. 12, 2002

(54) MOBILE CONTAINER FOR GOODS TRANSPORT BY ROAD

(75) Inventors: Jan Dirk Floor, Nijkerk; Robert Johan Hendricus Aardewijn, Huizen, both of (NL)

(73) Assignee: Floor Holding B. V. (NL)

( * ) Notice: Subject to any disclaimer, the term of this patent is extended or adjusted under 35 U.S.C. 154(b) by 0 days.

(21) Appl. No.: 09/425,771

(22) Filed: Oct. 22, 1999

(30) Foreign Application Priority Data

Oct. 26, 1998 (NL) .............................................. 1010398

(51) Int. Cl.[7] .......................... B60P 1/36; B62D 29/04; B62D 63/06
(52) U.S. Cl. ....................................... 414/528; 414/833
(58) Field of Search ................................ 414/528, 813; 198/833, 635

(56) References Cited

U.S. PATENT DOCUMENTS

| | | | | |
|---|---|---|---|---|
| 1,928,859 A | * | 10/1933 | Kutscha | 414/528 X |
| 2,791,339 A | * | 5/1957 | Sprague | 414/528 X |
| 3,278,056 A | * | 10/1966 | Beucler et al. | 414/528 X |
| 3,876,089 A | * | 4/1975 | Moser | 414/528 |
| 4,005,790 A | * | 2/1977 | Holland | 414/528 |
| 4,055,265 A | * | 10/1977 | Eisenman | 414/528 X |
| 4,106,643 A | * | 8/1978 | McGehee | 414/528 |
| 4,181,743 A | * | 1/1980 | Brumlick et al. | 426/241 |
| 4,601,629 A | * | 7/1986 | Zimmerman | 414/528 X |
| 4,790,715 A | * | 12/1988 | Alexander | 414/528 X |
| 4,925,356 A | * | 5/1990 | Snead et al. | 414/528 X |
| 5,102,285 A | * | 4/1992 | Gust | 414/528 |
| 5,118,244 A | | 6/1992 | Cook | |
| 5,472,290 A | | 12/1995 | Hulls | |
| 5,690,378 A | | 11/1997 | Romesburg | |

FOREIGN PATENT DOCUMENTS

| | | |
|---|---|---|
| DE | 9201633 | 5/1992 |
| EP | 0783991 | 7/1997 |
| FR | 2705929 | 12/1994 |

* cited by examiner

Primary Examiner—Robert P. Olszewski
Assistant Examiner—Gerald J. O'Connor
(74) Attorney, Agent, or Firm—Webb Ziesenheim Logsdon Orkin & Hanson, P.C.

(57) ABSTRACT

A mobile container for goods transport by road includes two standing side walls which enclose on a longitudinal side a converging open discharge channel. Two end walls connect to the side walls. A conveyor connects onto the open discharge channel. The mobile container further includes a substructure with at least one wheel pair. The substructure further includes coupling means for connecting the mobile container to a tractor vehicle. The side walls are manufactured from plastic. In addition, connecting panels, which engage over a determined length onto the side walls, are placed between the side walls. The assembled side walls, end walls and connecting panels together form a self-supporting construction.

16 Claims, 3 Drawing Sheets

MOBILE CONTAINER FOR GOODS TRANSPORT BY ROAD

BACKGROUND OF THE INVENTION

1. Field of the Invention

The invention relates to a mobile container for goods transport by road such as a semi-trailer or trailer.

2. Description of the Prior Art

Semi-trailer and trailers for transporting bulk goods such as for instance potatoes, onions, granulates and so on with a built-in unloading system are known. Such trailers are also referred to as potato trailers and contain a conveyor belt placed under the cargo space for discharging goods poured into the cargo space via the opened top side. The design of existing trailers and semi-trailers is based on a steel construction supported by a chassis likewise of steel. The side walls and sloping partitions of the cargo space are manufactured from steel, aluminium/PUR sandwich and/or multi-ply. The design of these semi-trailers and trailers has not changed, or hardly so, in twenty-five years.

The object of the present invention is to provide an improved mobile container such as a semi-trailer or trailer with a built-in unloading system which possesses both the transport volume and the functionality of the existing semi-trailers and trailers but which has a lower own weight. It is also an object to provide a mobile container which is relatively simple to assemble.

SUMMARY OF THE INVENTION

The invention provides for this purpose a mobile container for goods transport by road such as a semi-trailer or trailer, comprising two standing side walls which enclose on a longitudinal side a converging discharge channel, two end walls connected to the side walls, a conveyor connecting onto the discharge channel for discharge of products, a substructure with at least one wheel pair, and coupling means for connecting the mobile container to a tractor vehicle, wherein at least the side walls are manufactured from a plastic and the assembled side walls and end walls form a self-supporting construction. The self-supporting construction of side walls and end walls, which together form the cargo space, can be realized when the walls are manufactured from plastic, preferably a fibre-reinforced plastic. A very significant advantage of the self-supporting plastic cargo space is that a steel construction such as is applied in the existing semi-trailers and trailers becomes unnecessary. In addition, the chassis can also take a less heavy form than in the existing semi-trailers and trailers (or even be omitted). These various aspects result in a possible weight reduction of more than thirty percent. The result hereof is that the mobile container according to the invention is energy-saving relative to existing semi-trailers and trailers. The loading capacity is also greater. The plastic walls have the additional advantage that they are easy to clean and do not oxidize. A further advantage is that the walls can be manufactured such that they can be assembled in simple manner without much skill or time being necessary for this purpose. The production cost of the mobile container according to the invention can hereby also remain limited. The plastic walls are moreover thermally insulating, which can prevent freezing of the load at low temperatures.

Connecting panels engaging over a determined length onto the side walls are preferably placed between the side walls. Since the semi-trailers and trailers can have a length in the order of magnitude of 10–15 metres, it is necessary to try and find possible ways of increasing the rigidity of the construction. Placing of one or more connecting panels in the cargo space achieves this greater stiffness. In order to prevent excessive local loads on the plastic side walls, the panels engage on the side walls over a determined length. The forces exerted on a wall are thus distributed over a greater length. The connecting panels can for instance be manufactured from plastic-coated, waterproof multi-ply but it is recommended to also manufacture the connecting panels from plastic such as fibre-reinforced plastic. The advantages of water-tightness, corrosion-resistance, great strength, easy cleaning and insulation apply here also.

The conveyor is preferably formed by an endless belt conveyor and a protective hood is preferably arranged between the standing side walls at a distance from the discharge channel. Potatoes, onions, granulates and so on can be discharged from the cargo space by moving the belt conveyor. Since the belt conveyor is placed at the bottom of the cargo space, new product will continually be supplied from the cargo space until it is has been completely emptied. When the belt conveyor is at a standstill it forms the stationary underside of the cargo space and product will not be able to escape via the underside of the cargo space. In order to prevent excessive forces being exerted on the belt conveyor, a protective hood is placed at a distance above the belt conveyor. The protective hood is preferably elongate and the longitudinal sides of the protective hood are located closer to the discharge channel than the part of the protective hood located between the longitudinal sides. When the cargo space is filled with a larger quantity of products, some of these products will support on the protective hood, which limits the pressure exerted on the belt conveyor. In order to prevent products remaining behind on the protective hood during emptying of the cargo space, the hood is formed such that it is provided with one or two inclining sides, whereby the products lying on the protective hood will slide downward along the protective hood during emptying of the cargo space. The protective hood can be manufactured from wood but it is recommended that the protective hood be manufactured from plastic such as for instance fibre-reinforced plastic. The advantages of using plastic have already been described above, to which can be further added that, in contrast to when wood is used, no splinters can be left behind in the transported product.

At least one of the end sides is preferably provided with an opening at the height of the conveyor for passage of discharged goods or products. It is also possible to provide one of the end sides with recesses for accommodating operating means of the container. The discharge opening is required for passage out of the cargo space of goods discharged by the conveyor. In order to prevent goods or products passing through the opening in uncontrolled manner, the opening can be provided with a closing device such as for instance a slide or a door. For an improved finishing of the mobile container, one or more operating means can be integrated into one of the end sides. It is also possible to arrange storage space in one of the end sides or to create a space for access by an operative. Yet another variant is to give an end side a streamlined form so that the air resistance of the mobile container is limited during transport. This can all be realized very effectively by means of an end side manufactured from plastic, preferably fibre-reinforced plastic. In addition to the great design freedom of this material, it also provides the container with the necessary sturdiness.

In yet another preferred embodiment the side walls, end walls, panels and supports of the protective hood are connected such that they enclose rounded corners. This assembly is possible for instance using epoxy with glass fibre tape. The rounded corners enable easy cleaning of the mobile container.

The endless belt conveyor is preferably supported by at least one wedge-shaped supporting member. Such a wedge-shaped supporting member can also be manufactured from plastic and enables good support of the belt conveyor without this entailing a construction element on which dirt, for instance sand, clay and so on, can accumulate.

BRIEF DESCRIPTION OF THE DRAWINGS

The present invention will be further elucidated with reference to the non-limitative embodiments shown in the following figures, wherein.

DETAILED DESCRIPTION OF THE PREFERRED EMBODIMENTS

Figure 1:
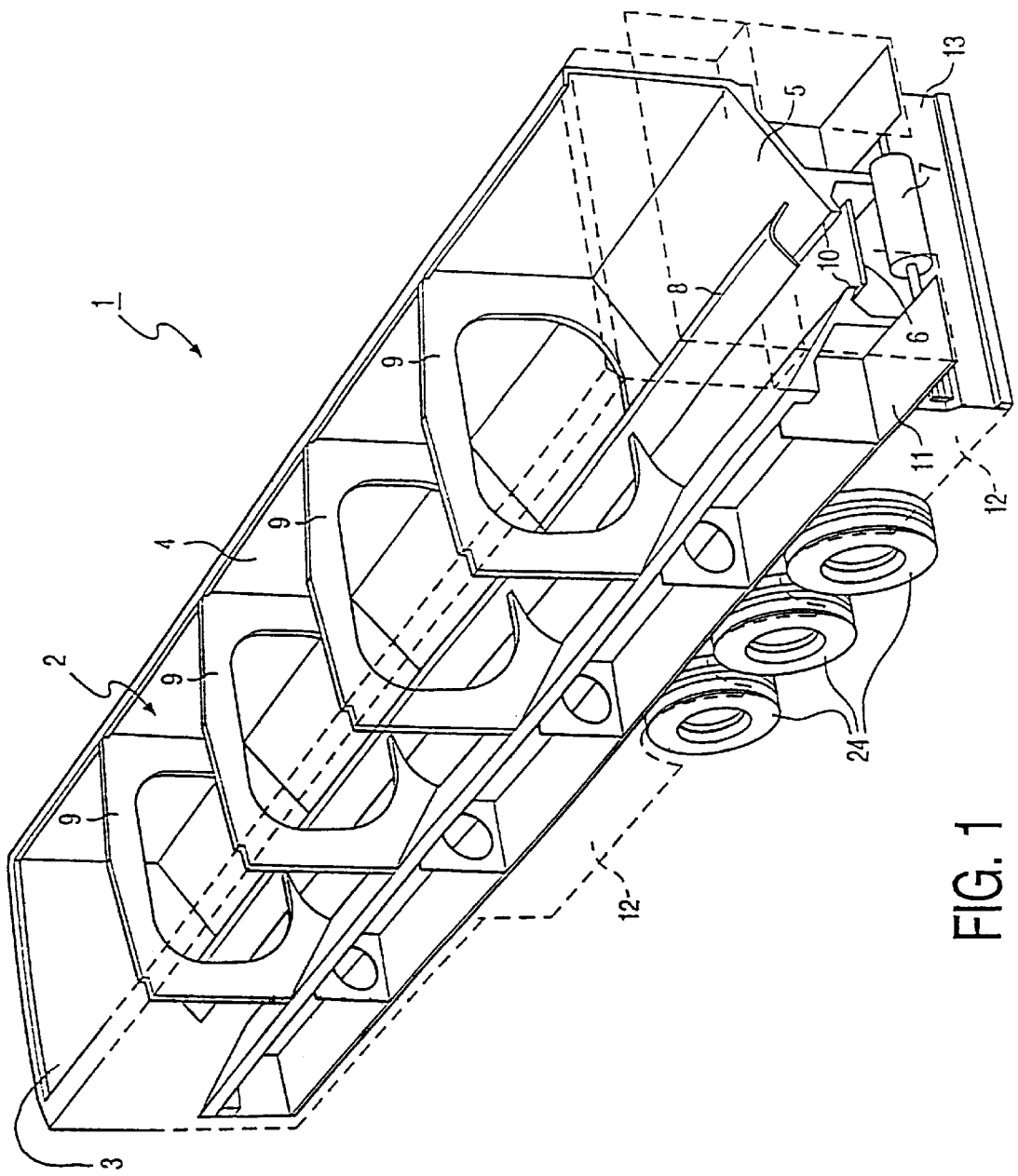
FIG. 1 shows a cut-away perspective view of the mobile container according to the invention.

FIG. 1 shows a semi-trailer 1 which comprises a cargo space 2, of which an end wall 3 and a side wall 4 are shown. A lower part of side wall 4 consists of a sloping partition 5. On the bottom edge this latter adjoins a belt conveyor 6. Cargo space 2 is defined by two side walls 4, two end walls 3 and belt conveyor 6 and is open at the top. Goods for transporting such as potatoes, onions or other tubers, cereals, granules and so on are poured into semi-trailer 1 via the opened top of cargo space 2.

By rotating a return roller 7 belt conveyor 6 is moved and goods can be discharged from cargo space 2. For the purpose of rotation the return roller 7 can be connected to an external drive, but it is also possible to accommodate the drive in return roller 7. Since the static load of belt conveyor 6 must remain limited, a protective hood 8 is placed above belt conveyor 6 which can take a major part of the weight of goods heaped high in cargo space 2. Connecting panels 9 are placed in cargo space 2 in order to increase the rigidity of semi-trailer 1. These connecting panels 9 connect the opposite side walls 4 and simultaneously form the support for protective hood 8. It is also possible to separate this functionality and to fix protective hood 8 in cargo space 2 with separate supports. The upper part of connecting panels 9 is formed such that a sheet placed over cargo space 2 slopes slightly towards side walls 4 so that rainwater cannot collect on such a sheet.

By having side walls 4 form part of a self-supporting construction good use is made of the material which is in any case required at that location. The sloping partitions 5 must anyway take a strong form in respect of the products falling thereon. The upper part of side walls 4 must also have a sturdiness such that they can withstand the pressure of the goods situated in cargo space 2. It is possible to make the walls or components thereof even more rigid and if necessary provide them with flanges. Since the bottom edge of each sloping partition 5 will be heavily loaded because conveyor belt 6 is suspended therefrom and also has a bearing function, the edge can be provided with a steel Z- or other profile. Other edges can also be strengthened with steel profiles.

Situated under cargo space 2 is a construction 11 with which for instance skirts 12, a lighting beam 13 and return rollers 7 can be supported. Wheels 24 engage via an axle housing (not shown in this figure) on both construction 11 and cargo space 2. Cargo space 2 is however embodied such that it can also be carried as separate container with a semi-trailer. The separate container can herein be fastened to the semi-trailer with for instance bolts.

Figure 2:
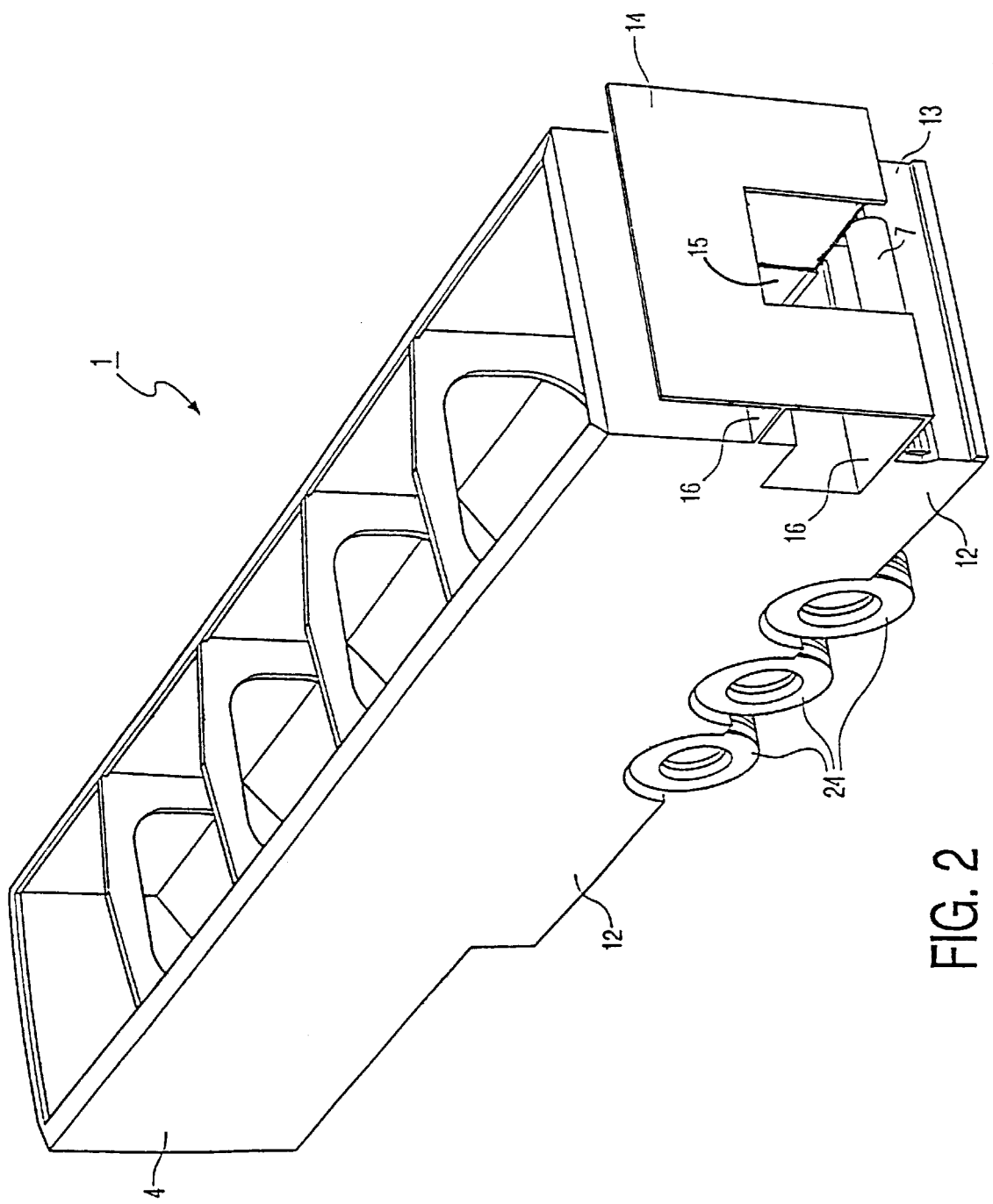
FIG. 2 is a perspective side view of the container shown in FIG. 1.

FIG. 2 shows semi-trailer 1 in side view, wherein is clearly shown that skirts 12 connect onto side wall 4 such that semi-trailer 1 has a wholly flat side, which gives a very modern appearance. This figure also shows a rear end wall 14 in which is arranged an opening 15 which enables discharge of goods by means of conveyor belt 6. The rear end wall 14 takes a double-walled form so that storage space is created for building in control equipment, while platforms 16 are also arranged therein which can be accessed by operative personnel.

Figure 3:
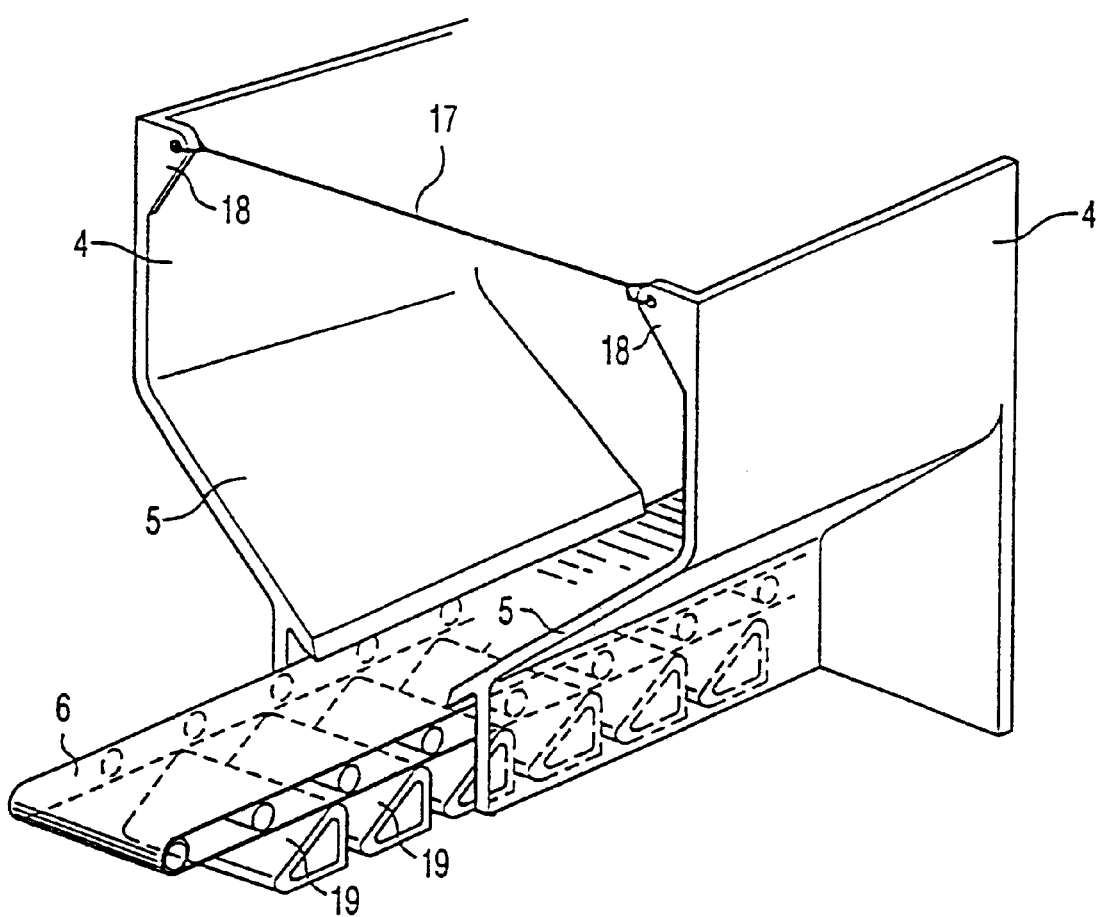
FIG. 3 shows a perspective cross-section through a variant of the semi-trailer shown in FIGS. 1 and 2.

FIG. 3 shows two opposite side walls 4 which are mutually connected by means of a pull rod 17. Arranged for this purpose on side walls 4 are ears 18 which engage on side walls 4 over a greater length. The pull rod 17 then connects onto these strengthened ears 18. Also shown clearly in this figure is that the transitions in side walls 4, for instance to sloping partitions 5, are all provided with rounded corners, which enables efficient cleaning of the construction. Belt conveyor 6 is supported by wedge-shaped supporting members 19, which are likewise easy to clean. Wedge-shaped supporting members 19 connect onto side walls 4 and prevent large quantities of sand, clay and so on remaining behind after transport of a cargo of for instance potatoes with adhering soil remnants. The significant advantage hereof is that tons of sand, clay and so on will not adhere to the semi-trailer, as is the case in existing potato trailers. This also reduces the transport weight of semi-trailer 1.

Although the invention is elucidated with reference to only a few embodiments, it will be apparent to all that the invention is not limited to the described and shown embodiments. On the contrary, many variations are still possible for the skilled person within the scope of the invention.

What is claimed is:

1. A mobile container for goods transport by road, comprising:

two standing side walls which define on a longitudinal bottom side a converging open discharge channel for free discharge of products therethrough;

two end walls connected to the side walls;

a plurality of vertically extending connecting panels extending between the side walls, with the connecting panels each connected to the respective side walls along lateral edges of the connecting panels, and with the connecting panels extending upward over substantially the entire height of the side walls;

a conveyor suspended from the side walls and located entirely below the open discharge channel and above any lower connection between the side walls for discharge of products from the container; and a substructure with at least one wheel pair and including coupling means for connecting the mobile container to a tractor vehicle, wherein at least the side walls are manufactured from plastic, wherein the assembled side walls, end walls and connecting panels together form a self-supporting construction, and wherein the upper run of the conveyor is unrestrained laterally by the sidewalls.

2. The container as claimed in claim 1, wherein the side walls are manufactured from fibre-reinforced plastic.

3. The container as claimed in claim 1, wherein the connecting panels are manufactured from fibre-reinforced plastic.

4. The container as claimed in claim 1, wherein the connecting panels are manufactured from plastic.

5. The container as claimed in claim 1, wherein the conveyor is an endless belt conveyor.

6. The container as claimed in claim 5, wherein the belt of the endless belt conveyor is supported by at least one wedge-shaped supporting member.

7. The container as claimed in claim 1, wherein a protective hood is arranged between the standing side walls at a distance from the open discharge channel.

8. The container as claimed in claim 7, wherein the protective hood is manufactured from plastic.

9. The container as claimed in claim 7, wherein the protective hood is elongate and longitudinal sides of the protective hood are located closer to the open discharge channel than the part of the protective hood located between the longitudinal sides.

10. The container as claimed in claim 7, wherein the protective hood is manufactured from fibre-reinforced plastic.

11. The container as claimed in claim 7, wherein the side walls, the end walls and the protective hood are mutually connected such that they enclose rounded corners.

12. The container as claimed in claim 1, wherein at least one of the end walls is provided with an opening at the height of the conveyor for passage of discharged goods.

13. The container as claimed in claim 1, wherein one of the end walls is provided with recesses for accommodating operating means of the container.

14. The container as claimed in claim 1, wherein at least one end wall is manufactured from plastic.

15. The container as claimed in claim 1, wherein the conveyor includes a plurality of rollers supporting the upper run of the conveyor.

16. The container as claimed in claim 1, wherein the end walls are manufactured from fibre-reinforced plastic.

* * * * *